Oct. 20, 1959 D. E. KEYT 2,909,195
SERVO VALVE
Filed March 24, 1958

Inventor:
Donald E. Keyt
By: Frank C. Parker Atty.

United States Patent Office 2,909,195
Patented Oct. 20, 1959

2,909,195
SERVO VALVE

Donald E. Keyt, Bedford, Mass., assignor, by mesne assignments, to Borg-Warner Corporation, Chicago, Ill., a corporation of Illinois Application March 24, 1958, Serial No. 723,260

12 Claims. (Cl. 137—623)

This invention relates to servo valves, and, in particular, to a hydraulic control servo valve for controlling the flow of fluid to utilization means for actuation thereof in accordance with an electrical control signal transmitted to the valve.

Systems have been developed in which a valve member of a control valve is moved a small distance by a relatively weak signal, such as an electrical impulse signal, whereby the control valve effects amplification of the control signal and converts the signal into a controlled flow of hydraulic fluid to either a controlled valve effecting movement thereof or to a load device for effecting movement thereof. The movement of the load device, therefore, will be in accordance with the particular control signal. When the control valve is utilized with a controlled valve, the movement of the controlled valve effects a flow of hydraulic fluid from a source of pressure fluid to a fluid actuated motor or other utilization device. This hydraulic flow is proportional and in accordance with the strength of the particular control signal which caused the actuation of the control valve. Such hydraulic systems are well known as being utilized in present day aircraft where information is transmitted into the hydraulic system in the form of electrical impulse signals from electronic equipment, such as guidance and fire control computers for armament equipment and navigational and flight control equipment. The strength of the electrical signal is determined by the electrical computer in sensing the requirements for the utilization device and is fed therefrom to the servo valve or control valve to cause movement thereof in a predetermined direction and magnitude of displacement. The direction and magnitude of displacement of the control valve is in response to and proportional to the particular strength of the control signal. The particular movement of the servo valve effects movement of the larger controlled valve which in turn interconnects a source of pressure fluid with a utilization device that is desired to be actuated in response to the control signal.

Since the utilization device to be actuated requires a relatively high pressure fluid and since the electrical computer is highly sensitive, the control valve to reflect a true and accurate movement in accordance with the sensitive control signal must be relatively small. The smaller the servo valve or control valve the greater the tendency for the mis-alignment of movable parts thereof to create fluid leakage and malfunctioning of the system as a whole.

It is, therefore, an object of this invention to provide a hydraulic servo or control valve that is relatively small but is adapted to have a valve member thereof moved in accurate proportion to a weak control signal fed to the servo or control valve.

It is another object of this invention to provide a hydraulic servo or control valve that is relatively small and, when inoperative, holds the tendency of fluid leakage therethrough to a minimum.

It is another object of this invention to provide a hydraulic servo valve having a movable valve member which is axially movable in response to a control signal whereby the movable valve member is adapted to convert the electrical signal into hydraulic flow by interconnecting a source of pressure fluid with one of a pair of utilization means and simultaneously inter-connecting the other utilization means with a sump.

Other and more particular objects, uses, and advantages of this invention will become apparent upon a reading of the following specification taken in connection with the accompanying drawing which forms a part thereof wherein.

Figure 1:
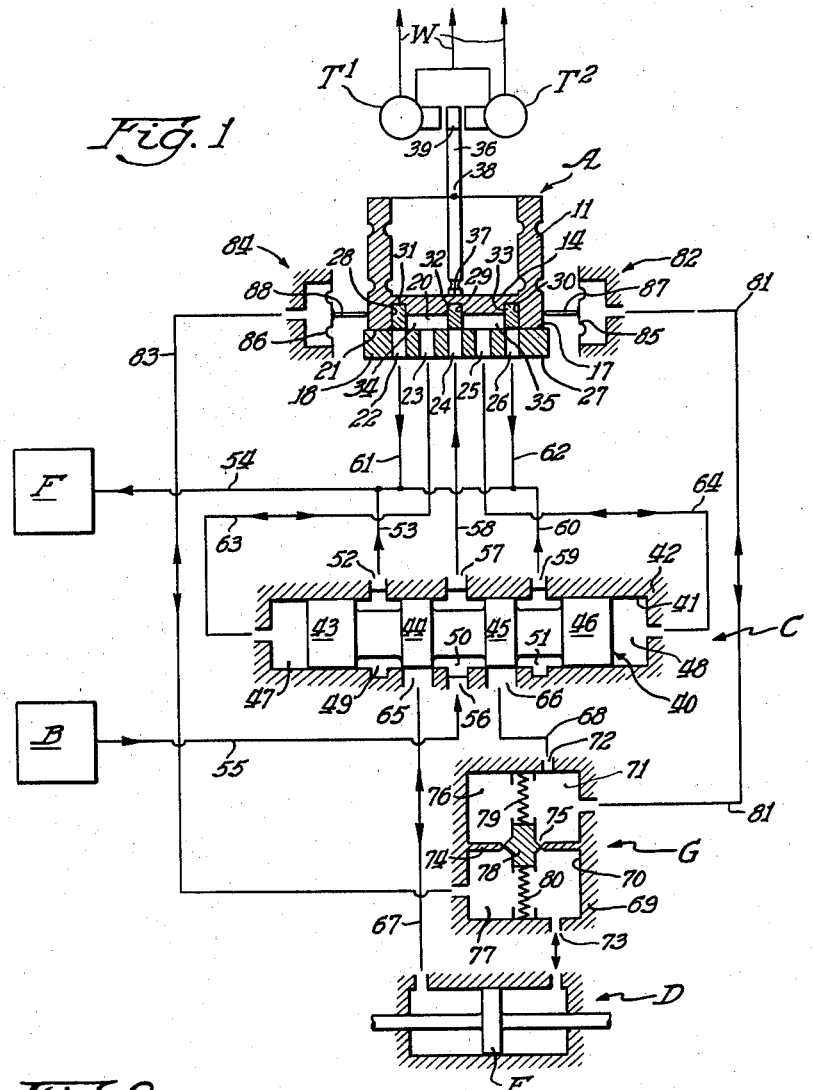
Figure 1 illustrates a control valve, shown in enlarged scale and in axial cross section, incorporated in a hydraulic system that is shown schematically.
Figure 2:
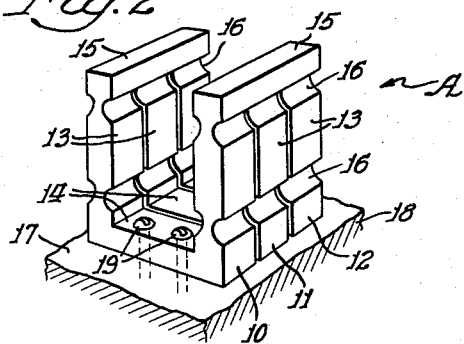
Figure 2 is a perspective view of the control valve illustrated in Figure 1.

Reference is made to the drawing wherein like reference numerals are used in the figures thereof to designate like parts, and particular reference is made to Figure 1 which illustrates a hydraulic control system which may be utilized as a control system for effecting movement of a particular aircraft mechanism in response to information in the form of an electrical impulse signal received by the control system from an electronic computer. It is to be understood that the system illustrated in Figure 1 is not limited only to aircraft application but is adapted to be utilized for many other types of hydraulically actuated devices. The system comprises a hydraulic servo or control valve, generally indicated by reference letter A, which is adapted to interconnect a pressure fluid source B with a controlled valve C to effect axial movement of a member of the controlled valve C. Movement of the movable member of the controlled valve C interconnects the pressure fluid source B with a utilization device, load, or motor D. The flow of pressure fluid from the controlled valve C to the utilization device D is in response to the strength of a predetermined electrical signal effecting proportionate movement of the control valve A. In this manner the piston E of the motor D is moved in a predetermined direction and for a predetermined distance to correspond to the particular electrical control signal fed to the control valve A.

It should be understood that the control valve A could directly effect movement of the load D without incorporating a controlled valve C in the hydraulic system. However, for purpose of illustration the control valve A is used in conjunction with a controlled valve C to provide an amplification of the electrical signal in the conversion thereof to a hydraulic flow such as is utilized in aircraft hydraulic systems as mentioned above.

If it is desired that the control system depicted in Figure 1 is to be utilized in a navigational system of an aircraft, the motor D may be adapted to actuate a movable air foil thereof such as the aircraft rudder. The navigational computer (not shown) sensing a deviation of the aircraft from a predetermined flight course will feed the information of the deviation in the form of an electrical impulse signal to the control valve A. The strength of the electrical signal will correspond to the amount of deviation sensed. The movable member of the control valve A will be moved axially in accordance with the electrical signal and cause a corresponding movement of the movable member of the controlled valve C to thereby interconnect the source B with the motor D to effect movement of the piston E thereof. The movement of the motor piston E causes a corresponding movement of the aircraft rudder in the desired direction and for a predetermined displacement to compensate for the deviation sensed by the navigational computer and thus returns the aircraft to its predetermined flight course.

The control valve A comprises a sandwich type plate valve formed of three U-shaped plates 10, 11, and 12 each having a pair of spaced parallel side portions 13 connected at one end thereof by a cross bar 14. Plates 10, 11, and 12 are arranged in a slightly spaced sandwiched relation and are fastened together in any suitable manner by a pair of parallel bar members 15 at the free ends of the side portions 13. The side portions 13 are formed with a plurality of reduced sections 16 to provide spring means later to be described. The outside plates 10 and 12 are suitably fastened to a substantially flat surface 17 of a mounting plate 18 such as by a plurality of bolts 19. In this manner the intermediate plate 11 is adapted to be suspended from the parallel bar members 15 and is adapted to have the lower portion and cross bar 14 thereof moved axially relative to the mounting plate 18 and outside plates 10 and 12. The reduced sections 16 in the side portions 13 of the intermediate plate 11 provide a resilient or biasing means tending to maintain the cross bar 14 of the plate 11 in a predetermined position relative to the mounting plate 18 and the outside plates 10 and 12.

The intermediate plate or movable plate 11, as shown in cross section in Figure 1, is provided with a medial recess or groove 20 in the end surface 21 of the cross bar 14. Surface 21 of the plate 11 is disposed adjacent to and in sealing relation with the flat surface 17 of the mounting plate 18, and when surface 21 is moved relative to the surface 17, the sealing relationship is still maintained.

A plurality of bores or passage means 22, 23, 24, 25, and 26 are formed in the mounting plate 18 interconnecting the flat surface 17 thereof with an opposed surface 27 thereof. The passages 22–26 are formed in aligned, parallel, and spaced relation in the mounting plate 18 and interconnect with the medial recess 20 of the movable plate 11 when the plate 11 is mounted to the plate 18.

When the movable plate 11 has its end surface 21 in its predetermined position relative to the mounting plate 18, maintained therein by the spring means 16, the medial recess or groove 20 of the movable plate 11 does not extend beyond the outside pair 22 and 26 of the passages 22–26. The diameters of the passages 22–26 are substantially the same size or slightly larger than the width of the medial recess 20.

The end surface 21 of the movable plate 11 is formed with three spaced, parallel, and aligned transverse bores 28, 29, and 30. The transverse bores 28, 29, and 30 are formed in the movable plate 11 at the medial recess means 20, and when the movable plate 11 is in its predetermined position relative to the mounting plate 18, transverse bores 28, 29, and 30 are respectively coaxial with passages 22, 24, and 26. One means for assuring coaxial alignment of the transverse bores 28, 29, and 30 with respect to the passages 22, 24, and 26 is to form the transverse bores 28, 29, and 30 when the plates 10, 11, and 12 have been mounted to plate 18. The passages 22, 24, and 26 could then be drilled simultaneously with the respective transverse bores 28, 29, and 30. Pin means 31, 32, and 33 are disposed respectively in transverse bores 28, 29, and 30. The diameters of the pin means 31, 32, and 33 are substantially the same size as or slightly greater than the diameters of the corresponding passages 22, 24, and 26. Further, the pin means 31, 32, and 33 are so formed that when they are disposed in the transverse bores 28, 29, and 30 they permit plate 11 to be axially moved relative to the flat surface 17 of the mounting plate 18 yet have the free ends thereof in sealing relation with the surface 17. The intermediate pin means 32 has a size sufficient to divide the medial recess 18 into two substantially equal sections 34 and 35.

The movable plate 11 is adapted to be moved relative to the mounting plate 18 by an armature 36 fastened at one end 37 thereof to the movable plate 11 and pivoted to a stationary member (not shown) at a point 38 intermediate its ends. The other end 39 of the armature 36 is disposed between a pair of opposed torque motors $T^1$ and $T^2$ which are respectively suitably mounted and electrically connected to the electronic computer by suitable electrical wire connections, such as are indicated at W. An electrical impulse fed by the electronic computer to torque motor $T^1$ will cause the end 39 of the armature 36 to move to the left, as viewed in the drawings, and cause a corresponding movement of the movable plate 11 to the right by means of the pivot point 38 thereof causing the armature to rotate counterclockwise. The plate 11 is moved to the left in a similar manner upon the transmission of an electrical signal to torque motor $T^2$.

It should be noted that when the movable plate 11 is in its predetermined position relative to the mounting plate 18, pin means 32 prevents fluid communication between passage 24 and either section 34 or 35 of the medial recess 20 and thus prevents fluid communication between the passage 24 and either adjacent passageway 23 or 25. Likewise, pin means 31 prevents fluid communication between passage 22 and the adjacent passage 23, and pin means 33 prevents fluid communication between the passages 25 and 26. Upon movement of plate 11 to the right, it can readily be seen that passage 24 will be in communication with passage 23 by means of section 34 and passage 25 will be in communication with passage 26 by means of section 35. Movement to the left of plate 11 effects fluid communication between passages 22 and 23 and fluid communication between passages 24 and 25.

The controlled valve C will now be described. The controlled valve C comprises a piston 40 disposed within a bore 41 formed in a housing 42 whereby the piston 40 is adapted to be axially movable relative to the housing 42 within the bore 41. The piston 40 has a plurality of spaced enlarged lands 43, 44, 45, and 46 formed thereon, the lands 43 and 46 being formed on the respective opposed ends of the piston 40 and the lands 44 and 45 being formed intermediately on the piston 40 and spaced from the lands 43 and 46 and from one another. Land 43 defines with one end of the bore 41 a pressure receiving chamber 47 and land 46 defines with the other end of the bore 41 another pressure receiving chamber 48. Chambers 47 and 48 are later referred to as utilization means which will become apparent upon a reading of the operation of the system which is hereinafter presented. Lands 43 and 44 cooperate with the bore 41 to define a chamber 49 therebetween. Lands 44 and 45 cooperate with bore 41 to form a chamber 50 therebetween. Lands 45 and 46 cooperate with bore 41 to form a chamber 51 therebetween. Chamber 49 is fluidly interconnected with a sump F by means of a passage 52 formed in the housing 42. A conduit 53 is in fluid communication at one end thereof with passage 52 and is in fluid communication with a conduit 54 at the other end thereof. Conduit 54, is, in turn, fluidly interconnected with the sump F. Chamber 50 is fluidly interconnected with the pressure fluid source B by means of a conduit 55 connected to the source B at one end thereof and to a passage 56 formed in the housing 42 at the other end thereof. Chamber 50 is also fluidly interconnected with passage 24 of the control valve A by means of a passage 57 formed in the housing 42 and an interconnecting conduit 58. Chamber 51 is fluidly interconnected with the sump F by means of a passage 59 formed in the housing 42 which is, in turn, fluidly interconnected with conduit 54 by an interconnecting conduit 60.

Passages 22 and 26 of the control valve A are fluidly interconnected to the sump or return conduit 54 by conduits 61 and 62 respectively. Passages 23 and 25 are respectively interconnected with chambers or utilization means 47 and 48 of the controlled valve C by conduits 63 and 64.

A pair of spaced passages 65 and 66 are formed in the housing 42 of the controlled valve C and are respectively fluidly interconnected with the left and right sides of the motor D by conduits 67 and 68. When the piston 40 of the controlled valve C is in its null position, i.e., when piston 40 is fully centered with respect to the bore 41 of housing 42, lands 44 and 45 respectively prevent fluid communication between either chamber 49 or 50 and conduit 67 and between either chamber 50 or 51 and conduit 67.

A flow sensor device, indicated generally by reference letter G, is disposed in fluid communication with the conduit 68 at a point intermediate the ends thereof. The flow sensor device G comprises a housing 69 having a bore 70 formed therein defining a chamber 71. Conduit 68 is fluidly interconnected with the upper end of chamber 71 by means of a passage 72 formed in the housing 69. The lower end of the chamber 71 is in turn fluidly interconnected with the right side of motor D by a passage 73 formed in the housing 69. A plate 74 is disposed intermediate the upper and lower ends of chamber 71 and is provided with a central aperture 75 therein. Plate 74 divides chamber 71 into an upper chamber 76 and a lower chamber 77. A baffle 78 is adapted to be telescopically received within the aperture 75 of the plate 74 and is retained in a position tending to prevent fluid communication between the upper chamber 76 and lower chamber 77 by opposed spring means 79 and 80. The upper chamber 76 is fluidly interconnected by conduit 81 with a bellows or fluid motor 82 operatively associated with the right side of the movable plate 11 of the control valve A. The lower chamber 77 is fluidly interconnected by a conduit 83 with a bellows or fluid motor 84 operatively associated with the left side of the movable plate 11 of the control valve A. The bellows 82 and 84 have respectively movable diaphragms 85 and 86 directly connected to the movable plate 11 by respective shafts 87 and 88.

The operation of the hydraulic system depicted in Figure 1 is as follows: Assuming that the electronic computer, which is to determine the position of the piston E of motor D, concludes that the piston E should be moved to the left, as viewed in the drawing, the computer sends an electrical impulse signal to the torque motor $T^1$. The strength of the electrical signal determines the extent of desired displacement of the piston E. Torque motor $T^1$, thus energized, causes movement of the armature end 39 to the left toward the torque motor $T^1$ effecting axial movement of the end surface of the movable plate 11 to the right as the armature 36 pivots counterclockwise about its pivot point 38. Movement of the movable plate 11 to the right relative to the stationary mounting plate 18 in opposition to the biasing means 16 permits pressure fluid from the source B to pass through passage 24 into section 34 and out through passage 23. This flow of pressure fluid passes from passage 23 through conduit 63 to the chamber or utilization means 47 of the controlled valve C. The force of the pressure fluid within chamber or utilization means 47 causes axial movement of the piston 40 toward the right. Any pressure fluid within chamber or utilization means 48 of the controlled valve C will be discharged by movement of the piston 40 to the right forcing the pressure fluid through conduit 64, passage 25 of the control valve A, section 35, passage 26 to the sump F by means of the interconnecting conduits 62 and 54. Movement of the piston 40 of the controlled valve C to the right effects fluid communication between the source of pressure fluid B through conduit 55, chamber 50 and conduit 68. The fluid pressure delivered by conduit 68 to the flow sensor device G enters the upper chamber 76 thereof and causes movement of the shuttle or baffle device 78 downwardly to permit the fluid within upper chamber 76 to pass through the aperture 75 of the plate 74 into the lower chamber 77 and subsequently to the right side of the motor D effecting movement of the piston E thereof to the left. This leftward movement of the piston E causes the pressure fluid at the left side of the piston E to be expelled through conduit 67, chamber 49, and conduits 53 and 54 to the sump F.

Since the pressure fluid from the source B is flowing through conduit 68 by movement of the controlled valve C to the right, the pressure value of the fluid within the upper chamber 76 of the flow sensor device G is greater than the pressure value of the fluid within the lower chamber 77. This differential in pressure value is caused by the restricted orifice in the flow sensor device G formed by the relation of the shuttle device 78 with respect to the aperture 75 of the plate 74. Since bellows 82 of the control valve A senses the pressure in the upper chamber 76 of the flow sensor device G and bellows 84 senses the pressure of the lower chamber 77, the pressure fluid communicated to bellows 82 has a higher pressure value than that communicated to bellows 84. Therefore, the pressure differential existing between bellows 82 and 84 is such that the force of the pressure fluid within bellows 82 acting on the movable diaphragm 85 and shaft 87 thereof causes axial movement of the plate 11 to the left in opposition to the force of the torque motor $T^1$ tending to maintain the plate 11 in its displacement position to the right. This feed back arrangement of bellows 82 and 84 permits a close regulation of the control valve A in response to the flow of the pressure fluid directed by the controlled valve C to the motor D.

When the piston E of motor D has moved to the left a sufficient distance to satisfy the requirements of the electrical computer, the electrical impulse signal directed to the torque motor $T^1$ is terminated by the computer and the force of the pressure fluid within bellows 82 causes movement of the plate 11 to the left past its null position in opposition to the force of the spring means 16 tending to maintain plate 11 in its predetermined position, i.e., its null position. When plate 11 is moved to the left by the force of the pressure fluid within bellows 82, the pressure fluid from passage 24 is fluidly interconnected through section 35 with passage 25 and subsequently with the chamber or utilization means 48 of the controlled valve C. Chamber or utilization means 47 is now connected with the sump F by conduit 63, passage 23, section 34, passage 22, and conduits 61 and 54. The force of the pressure fluid within chamber 48 acting on the end of land 46 then returns piston 40 toward its null position, i.e., to the left from its displaced position. When piston 40 is in its null position, no pressure fluid is flowing through the flow sensing device G. Therefore, the pressure values of the pressure fluids within the upper chamber 76 and lower chamber 77 of the flow sensor device G are equal. This equalization of pressure values in the upper chamber 76 and lower chamber 77 causes a corresponding equalization of pressure values in the pressure fluids communicated to the bellows 82 and 84. The pressure values being equal in bellows 82 and 84 permits the spring means 16 of the movable plate 11 to position plate 11 in its null or predetermined position. When the plate 11 is in its null or predetermined position, no pressure fluid is communicated to chambers or utilization means 47 and 48. In this manner piston 40 is retained in its centered or null position. The system remains as shown in Figure 1 until one of the torque motors $T^1$ or $T^2$ receives an electrical signal effecting changes therein as above described.

When the piston E of the motor D is desired to be moved to the right by the electronic computer, an electrical impulse is directed to torque motor $T^2$ and the converse in the operation set forth above occurs in substantially the same manner as when the impulse was directed to torque motor $T^1$. It is to be understood that upon actuation of torque motor $T^2$ the flow of pressure fluid from source B to the motor D is through conduit 67 and from the motor D through conduit 68 and flow sensor device G to the sump F. The feed back arrangement of bellows 82 and 84 operates in substantially the same manner except that bellows 84 contains the higher pressure value fluid.

As can be seen, there has been disclosed a control valve or servo valve which is relatively simple to manufacture yet effective to cause amplification of relatively weak electrical signals and convert the same into a hydraulic control signal to effect movement of a hydraulic valve by directing a flow of pressure fluid from a source to one utilization means of the controlled valve and venting another utilization means of the controlled valve to a sump and thereby effecting the subsequent movement of the utilization device in accordance with that electrical control signal.

It should also be noted that there has been disclosed a servo valve which when in its null or predetermined position is only subject to leakage around the pin means 32 regardless of whether the other apertures and parts are in misalignment. This permits the servo valve to be made relatively small yet have the advantage of eliminating malfunctioning because of leakage.

While the servo valve A has been disclosed as operating a controlled valve C, it is to be understood that the control valve A may be utilized in many different applications in which a controlled valve is not used whereby the control valve A directly communicates fluid pressure flow to a utilization device or devices.

Although the passages 22–26, transverse bores 28, 29, and 30, and pin means 31, 32, and 33 have been described as being cylindrical, it should be understood that they may have any cross-sectional configuration so long as pin means 32 prevents fluid communication between passage 24 and either adjacent passage 23 or 25 when plate 11 is in its null or predetermined position.

While the various parts of this invention have been referred to as being located in the upper or lower, right or left position and moving to the right or left and upwardly or downwardly, it will be understood that this is done solely for the purpose of facilitating description and such references relate only to the relative positions or movements of the parts as shown in the accompanying drawing.

Also, it is to be understood that many changes and modifications may be made to the structure of the valve disclosed without departing from the spirit and scope of the invention which is defined by the appended claims.

What is claimed is:

1. A fluid control valve device comprising: a first member having a first surface; a second member fixed relative to said first member and having a portion thereof movable relative to said first member, said portion having an end surface in sealing engagement with said first surface; means defining a plurality of spaced passage means disposed in said first member interconnecting said first surface adjacent said end surface with the exterior of said first member, said passage means including at least one passage and a pair of passages being so disposed whereby each passage of said pair is disposed adjacent to said one passage; means defining medial recess means in said end surface of said portion of said second member; biasing means carried by said second member tending to maintain said end surface in a predetermined position relative to said first inlet surface of said first member; a plurality of pin means carried by said portion of said second member dividing said recess means into at least two sections, one of said pin means being adapted to prevent fluid communication between said one passage and each passage of said pair of passages when said end surface is in said predetermined position; and means operatively associated with said portion of said second member being adapted to cause selected movement of said end surface relative to said flat surface in opposition to said biasing means whereby said one pin means permits one of said sections to fluidly interconnect said one passage with one of the passages of said pair of passages.

2. A fluid control valve device comprising: a first member having a substantially flat surface; a second member fixed relative to said first member and having a portion thereof movable relative to said first member, said portion having an end surface in sealing engagement with said flat surface; means defining a plurality of spaced passage means disposed in said first member interconnecting said flat surface adjacent said end surface with the exterior of said first member, said passage means including at least one passage and a pair of passages being so disposed whereby each passage of said pair is disposed adjacent to said one passage; means defining medial recess means in said end surface of said portion of said second member; biasing means carried by said second member tending to maintain said end surface in a predetermined position relative to said flat surface of said first member; a plurality of pin means carried by said portion of said second member dividing said recess means into two equal sections, one of said pin means being adapted to prevent fluid communication between said one passage and each passage of said pair of passages when said end surface is in said predetermined position; and means operatively associated with said portion of said second member being adapted to cause selected movement of said end surface relative to said flat surface in opposition to said biasing means whereby said one pin means permits one of said sections to fluidly interconnect said one passage with one of the passages of said pair of passages.

3. A fluid control valve device comprising: a first member having a first surface; a second member fixed relative to said first member and having a portion thereof movable relative to said first member, said portion having an end surface in sealing engagement with said first surface; means defining a plurality of spaced passage means disposed in said first member interconnecting said first surface adjacent said end surface with the exterior of said first member, said passage means including at least one passage and a pair of passages being so disposed whereby each passage of said pair is disposed adjacent to said one passage; means defining medial recess means in said end surface of said portion of said second member; biasing means carried by said second member tending to maintain said end surface in a predetermined position relative to said flat surface of said first member; means defining a plurality of spaced transverse bore means in said portion of said second member, one of said transverse bore means being coaxial with said one passage when said end surface is in said predetermined position; a plurality of pin means carried by said portion, each of said pin means being disposed in each of said transverse bore means whereby said pin means divides said recess means into at least two sections, one of said pin means disposed in said one transverse bore means being adapted to prevent fluid communication between said one passage and each passage of said pair of passages when said end surface is in said predetermined position; and means operatively associated with said portion of said second member being adapted to cause selected movement of said end surface relative to said first surface in opposition to said biasing means whereby said one pin means permits one of said sections to fluidly interconnect said one passage with one of the passages of said pair of passages.

4. A fluid control valve device being adapted to selectively interconnect one of a pair of utilization means with a pressure fluid source comprising: a first member having a first surface; a second member fixed relative to said first member and having a portion thereof movable relative to said first member, said portion having an end surface in sealing engagement with said first surface; means defining a plurality of spaced passage means disposed in said first member interconnecting said first surface adjacent said end surface with the exterior of said first member, said passage means including at least one passage and a pair of passages being so disposed whereby each passage of said pair is disposed adjacent to said one passage; means fluidly interconnecting said one passage with said pressure fluid source; means fluidly interconnecting each passage of said pair of passages with each of said utilization means; means defining medial recess means in said end surface of said portion of said second member; biasing means carried by said second member tending to maintain said end surface in a predetermined position relative to said flat surface of said first member; a plurality of pin means carried by said portion of said second member dividing said recess means into at least two sections, one of said pin means being adapted to prevent fluid communication between said one passage and each passage of said pair of passages when said end surface is in said predetermined position; and means operatively associated with said portion of said second member being adapted to cause selected movement of said end surface relative to said first surface in opposition to said biasing means whereby said one pin means permits one of said sections to fluidly interconnect said one passage with one of the passages of said pair of passages to thereby interconnect one of said utilization means with said pressure fluid source.

5. A fluid control valve device being adapted to selectively interconnect one of a pair of utilization means with a pressure fluid source comprising: a first member having a substantially flat surface; a second member fixed relative to said first member and having a portion thereof movable relative to said first member, said portion having an end surface in sealing engagement with said flat surface; means defining a plurality of spaced passage means disposed in said first member interconnecting said flat surface adjacent said end surface with the exterior of said first member, said passage means including at least one passage and a pair of passages being so disposed whereby each passage of said pair is disposed adjacent to said one passage; means fluidly interconnecting said one passage with said pressure fluid source; means fluidly interconnecting each passage of said pair of passages with each of said utilization means; means defining medial recess means in said end surface of said portion of said second member; biasing means carried by said second member tending to maintain said end surface in a predetermined position relative to said flat surface of said first member; a plurality of pin means carried by said portion of said second member dividing said recess means into two equal sections, one of said pin means being adapted to prevent fluid communication between said one passage and each passage of said pair of passages when said end surface is in said predetermined position; and means operatively associated with said portion of said second member being adapted to cause selected movement of said end surface relative to said flat surface in opposition to said biasing means whereby said one pin means permits one of said sections to fluidly interconnect said one passage with one of the passages of said pair of passages to thereby interconnect one of said utilization means with said pressure fluid source.

6. A fluid control valve device being adapted to selectively interconnect one of a pair of utilization means with a pressure fluid source comprising: a first member having a first surface; a second member fixed relative to said first member and having a portion thereof movable relative to said first member, said portion having an end surface in sealing engagement with said first surface; means defining a plurality of spaced passage means disposed in said first member interconnecting said first surface adjacent said end surface with the exterior of said first member, said passage means including at least one passage and a pair of passages being so disposed whereby each passage of said pair is disposed adjacent to said one passage; means fluidly interconnecting said one passage with said pressure fluid source; means fluidly interconnecting each passage of said pair of passages with each of said utilization means; means defining medial recess means in said end surface of said portion of said second member; biasing means carried by said second member tending to maintain said end surface in a predetermined position relative to said first surface of said first member; means defining a plurality of spaced transverse bore means in said portion of said second member, one of said transverse bore means being coaxial with said one passage when said end surface is in said predetermined position; a plurality of pin means carried by said portion, each of said pin means being disposed in each of said transverse bore means whereby said pin means divides said recess means into at least two sections, one of said pin means disposed in said one transverse bore means being adapted to prevent fluid communication between said one passage and each passage of said pair of passages when said end surface is in said predetermined position; and means operatively associated with said portion of said second member being adapted to cause selected movement of said end surface relative to said first surface in opposition to said biasing means whereby said one pin means permits one of said sections to fluidly interconnect said one passage with one of the passages of said pair of passages to thereby interconnect one of said utilization means with said pressure fluid source.

7. A fluid control valve device comprising: a first member having a first surface; a second member fixed relative to said first member and having a portion thereof movable relative to said first member, said portion having an end surface in sealing engagement with said first surface; means defining a plurality of spaced passage means disposed in said first member interconnecting said first surface adjacent said end surface with the exterior of said first member, said passage means including at least one passage, a first pair of passages and a second pair of passages being so disposed whereby each passage of said first pair of passages is disposed adjacent to said one passage and each passage of said second pair of passages is disposed remote from said one passage and adjacent to one of the passages of said first pair of passages; means defining medial recess means in said end surface of said first portion of said second member; biasing means carried by said second member tending to maintain said end surface in a predetermined position relative to said first surface of said first member; a plurality of pin means carried by said portion of said second member dividing said recess means into at least two sections, one of said pin means being adapted to prevent fluid communication between said one passage and each passage of said first pair of passages and other of said pin means being adapted to prevent fluid communication between each passage of said first pair of passages and its adjacent passage of said second pair of passages when said end surface is in said predetermined position; and means operatively associated with said portion of said second member being adapted to cause selected movement of said end surface relative to said first surface in opposition to said biasing means whereby said one pin means permits one of said sections to fluidly interconnect said one passage with one of the passages of said first pair of passages and another of said pin means permits another of said sections to fluidly interconnect the other passage of said first pair of passages with its said adjacent passage of said second pair of passages.

8. A fluid control valve device comprising: a first member having a substantially flat surface; a second member fixed relative to said first member and having a portion thereof movable relative to said first member, said portion having an end surface in sealing engagement with said flat surface; means defining a plurality of spaced passage means disposed in said first member interconnecting said flat surface adjacent said end surface with the exterior of said first member, said passage means including at least one passage, a first pair of passages and a second pair of passages being so disposed whereby each passage of said first pair of passages is disposed adjacent to said one passage and each passage of said second pair of passages is disposed remote from said one passage and adjacent to one of the passages of said first pair of passages; means defining medial recess means in said end surface of said first portion of said second member; biasing means carried by said second member tending to maintain said end surface in a predetermined position relative to said flat surface of said first member; a plurality of pin means carried by said portion of said second member dividing said recess means into two equal sections, one of said pin means being adapted to prevent fluid communication between said one passage and each passage of said first pair of passages and other of said pin means being adapted to prevent fluid communication between each passage of said first pair of passages and its adjacent passage of said second pair of passages when said end surface is in said predetermined position; and means operatively associated with said portion of said second member being adapted to cause selected movement of said end surface relative to said flat surface in opposition to said biasing means whereby said one pin means permits one of said sections to fluidly interconnect said one passage with one of the passages of said first pair of passages and another of said pin means permits the other of said sections to fluidly interconnect the other passage of said first pair of passages with its said adjacent passage of said second pair of passages.

9. A fluid control valve device comprising: a first member having a first surface; a second member fixed relative to said first member and having a portion thereof movable relative to said first member, said portion having an end surface in sealing engagement with said first surface; means defining a plurality of spaced passage means disposed in said first member interconnecting said first surface adjacent said end surface with the exterior of said first member, said passage means including at least one passage, a first pair of passages and a second pair of passages being so disposed whereby each passage of said first pair of passages is disposed adjacent to said one passage and each passage of said second pair of passages is disposed remote from said one passage and adjacent to one of the passages of said first pair of passages; means defining medial recess means in said end surface of said first portion of said second member; biasing means carried by said second member tending to maintain said end surface in a predetermined position relative to said flat surface of said first member; means defining a plurality of transverse bore means in said portion of said second member, one of said transverse bore means being coaxial with said one passage and a pair of transverse bore means being coaxial with said second pair of passages when said end surface is in said predetermined position; a plurality of pin means carried by said portion, each of said pin means being disposed in each of said transverse bore means whereby said pin means divides said recess means into at least two sections, one of said pin means disposed in said one transverse bore means being adapted to prevent fluid communication between said one passage and each passage of said first pair of passages and a pair of said pin means disposed in said pair of transverse bore means being adapted to prevent fluid communication between each passage of said first pair of passages and its adjacent passage of said second pair of passages; and means operatively associated with said portion of said second member being adapted to cause selected movement of said end surface relative to said first surface in opposition to said biasing means whereby said one pin means permits one of said sections to fluidly interconnect said one passage with one of the passages of said first pair of passages and another of said pin means permits another of said sections to fluidly interconnect the other passage of said first pair of passages with its said adjacent passage of said second pair of passages.

10. A fluid control valve device being adapted to selectively interconnect one of two utilization means with a pressure fluid source and simultaneously interconnect the other of said utilization means with a sump comprising: a first member having a first surface; a second member fixed relative to said first member and having a portion thereof movable relative to said first member, said portion having an end surface in sealing engagement with said first surface; means defining a plurality of spaced passage means disposed in said first member interconnecting said first surface adjacent said end surface with the exterior of said first member, said passage means including at least one passage, a first pair of passages and a second pair of passages being so disposed whereby each passage of said first pair of passages is disposed adjacent to said one passage and each passage of said second pair of passages is disposed remote from said one passage and adjacent to one of the passages of said first pair of passages; means fluidly interconnecting said one passage with said pressure fluid source; means fluidly interconnecting each passage of said first pair of passages with each of said utilization means; means fluidly interconnecting each passage of said second pair of passages with said sump; means defining medial recess means in said end surface of said first portion of said second member; biasing means carried by said second member tending to maintain said end surface in a predetermined position relative to said first member; a plurality of pin means carried by said portion of said second member dividing said recess means into at least two sections, one of said pin means being adapted to prevent fluid communication between said one passage and each passage of said first pair of passages and other of said pin means being adapted to prevent fluid communication between each passage of said first pair of passages and its adjacent passage of said second pair of passages when said end surface is in said predetermined position; and means operatively associated with said portion of said second member being adapted to cause selected movement of said end surface relative to said first surface in opposition to said biasing means whereby said one pin means permits one of said sections to fluidly interconnect said one passage with one of the passages of said first pair of passages and another of said pin means permits another of said sections to fluidly interconnect the other passage of said first pair of passages with its said adjacent passage of said second pair of passages to thereby fluidly interconnect one of said utilization means with said pressure fluid source and the other of said utilization means with said sump.

11. A fluid control valve device being adapted to selectively interconnect one of two utilization means with a pressure fluid source and simultaneously interconnect the other of said utilization means with a sump comprising: a first member having a substantially flat surface; a second member fixed relative to said first member and having a portion thereof movable relative to said first member, said portion having an end surface in sealing engagement with said flat surface; means defining a plurality of spaced passage means disposed in said first member interconnecting said flat surface adjacent said end surface with the exterior of said first member, said passage means including at least one passage, a first pair of passages and a second pair of passages being so disposed whereby each passage of said first pair of passages is disposed adjacent to said one passage and each passage of said second pair of passages is disposed remote from said one passage and adjacent to one of the passages of said first pair of passages; means fluidly interconnecting said one passage with said pressure fluid source; means fluidly interconnecting each passage of said first pair of passages with each of said utilization means; means fluidly interconnecting each passage of said second pair of passages with said sump; means defining medial recess means in said end surface of said first portion of said second member; biasing means carried by said second member tending to maintain said end surface in a predetermined position relative to said first member; a plurality of pin means carried by said portion of said second member dividing said recess means into two equal sections, one of said pin means being adapted to prevent fluid communication between said one passage and each passage of said first pair of passages and other of said pin means being adapted to prevent fluid communication between each passage of said first pair of passages and its adjacent passage of said second pair of passages when said end surface is in said predetermined position; and means operatively associated with said portion of said second member being adapted to cause selected movement of said end surface relative to said flat surface in opposition to said biasing means whereby said one pin means permits one of said sections to fluidly interconnect said one passage with one of the passages of said first pair of passages and another of said pin means permits the other of said sections to fluidly interconnect the other passage of said first pair of passages with its said adjacent passage of said second pair of passages to thereby fluidly interconnect one of said utilization means with said pressure fluid source and the other of said utilization means with said sump.

12. A fluid control valve device being adapted to selectively interconnect one of two utilization means with a pressure fluid source and simultaneously interconnect the other of said utilization means with a sump comprising: a first member having a first surface; a second member fixed relative to said first member and having a portion thereof movable relative to said first member, said portion having an end surface in sealing engagement with said first surface; means defining a plurality of spaced passage means disposed in said first member interconnecting said first surface adjacent said end surface with the exterior of said first member, said passage means including at least one passage, a first pair of passages and a second pair of passages being so disposed whereby each passage of said first pair of passages is disposed adjacent to said one passage and each passage of said second pair of passages is disposed remote from said one passage and adjacent to one of the passages of said first pair of passages; means fluidly interconnecting said one passage with said pressure fluid source; means fluidly interconnecting each passage of said first pair of passages with each of said utilization means; means fluidly interconnecting each passage of said second pair of passages with said sump; means defining medial recess means in said end surface of said first portion of said second member; biasing means carried by said second member tending to maintain said end surface in a predetermined position relative to said first member; means defining a plurality of transverse bore means in said portion of said second member, one of said transverse bore means being coaxial with said one passage and a pair of transverse bore means being coaxial with said second pair of passages when said end surface is in said predetermined position; a plurality of pin means carried by said portion, each of said pin means being disposed in each of said transverse bore means whereby said pin means divides said recess means into at least two sections, one of said pin means disposed in said one transverse bore means being adapted to prevent fluid communication between said one passage and each passage of said first pair of passages and a pair of said pin means disposed in said pair of transverse bore means being adapted to prevent fluid communication between each passage of said first pair of passages and its adjacent passage of said second pair of passages; and means operatively associated with said portion of said second member being adapted to cause selected movement of said end surface relative to said first surface in opposition to said biasing means whereby said one pin means permits one of said sections to fluidly interconnect said one passage with one of the passages of said first pair of passages and another of said pin means permits another of said sections to fluidly interconnect the other passage of said first pair of passages with its said adjacent passage of said second pair of passages to thereby fluidly interconnect one of said utilization means with said pressure fluid source and the other of said utilization means with said sump.

References Cited in the file of this patent

UNITED STATES PATENTS

| | | |
|---|---|---|
| 2,345,837 | Smith | Apr. 4, 1944 |
| 2,353,503 | Rost et al. | July 11, 1944 |
| 2,875,782 | Lee | Mar. 3, 1959 |

OTHER REFERENCES

Applied Hydraulics, October 1956, pages 80 and 81.

UNITED STATES PATENT OFFICE
CERTIFICATE OF CORRECTION

Patent No. 2,909,195                                                  October 20, 1959

Donald E. Keyt

It is hereby certified that error appears in the printed specification of the above numbered patent requiring correction and that the said Letters Patent should read as corrected below.

Column 5, line 48, for "end surface" read -- end surface 21 --; column 7, line 66, for "first inlet surface" read -- first surface --.

Signed and sealed this 12th day of April 1960.

(SEAL)
Attest:

KARL H. AXLINE                                              ROBERT C. WATSON
Attesting Officer                                       Commissioner of Patents